United States Patent [19]

Doi

[11] Patent Number: 4,909,489

[45] Date of Patent: Mar. 20, 1990

[54] MOUNTING DEVICE SUITABLE FOR SUPPORTING AUTOMOTIVE POWER UNITS

[75] Inventor: Kazuhiro Doi, Yokohama, Japan

[73] Assignee: Nissan Motor Co., Ltd., Japan

[21] Appl. No.: 330,689

[22] Filed: Mar. 30, 1989

[30] Foreign Application Priority Data

Mar. 31, 1988 [JP] Japan ................................. 63-79291

[51] Int. Cl.⁴ ....................... F16F 13/00; B60G 15/04
[52] U.S. Cl. .................................. 267/140.1; 248/562; 248/636; 248/566; 267/141.2; 267/219
[58] Field of Search .................. 267/140.1, 141.2, 219, 267/279, 292, 220, 35; 180/902, 300, 312; 248/550, 636, 562, 566; 188/267, 268

[56] References Cited

U.S. PATENT DOCUMENTS

| | | | |
|---|---|---|---|
| 4,693,456 | 9/1987 | Kanda | 267/140.1 |
| 4,717,111 | 1/1988 | Saito | 267/140.1 X |
| 4,720,087 | 1/1988 | Duclos et al. | 267/140.1 |
| 4,728,086 | 3/1988 | Ishiyama et al. | 267/140.1 |

*Primary Examiner*—Douglas C. Butler
*Attorney, Agent, or Firm*—Leydig, Voit & Mayer

[57] ABSTRACT

A mounting device includes an elastomeric body formed with first and second recesses which define a working chamber and an expansion chamber which are filled with an ERF (electrorheological). The recesses are enclosed by an annular member to define the chambers. First and second helical orifice passages formed about the periphery of the annular member fluidly connect the chambers. A cylindrical outer casing which encloses the elastomeric body and annular member is grounded to act as a first electrode. Strips disposed in the orifice passages act as electrodes on which voltages can be selectively and separately impressed.

11 Claims, 5 Drawing Sheets

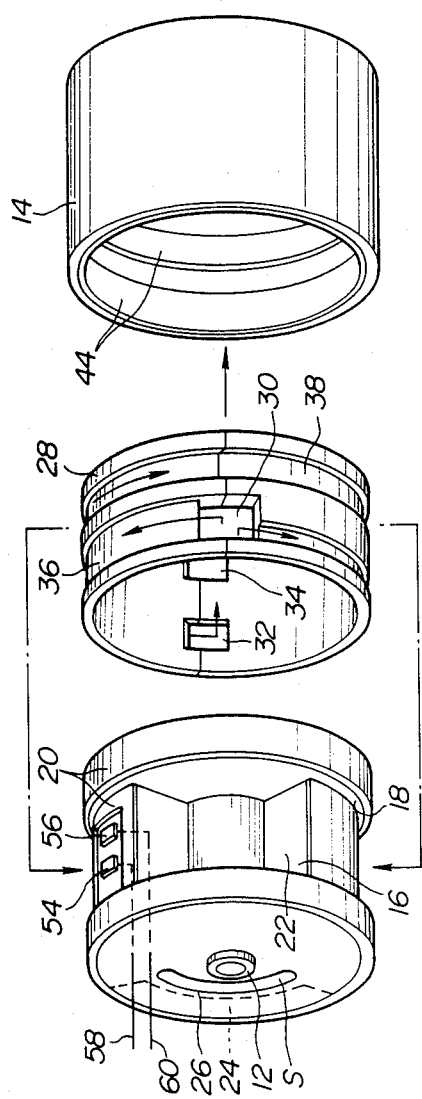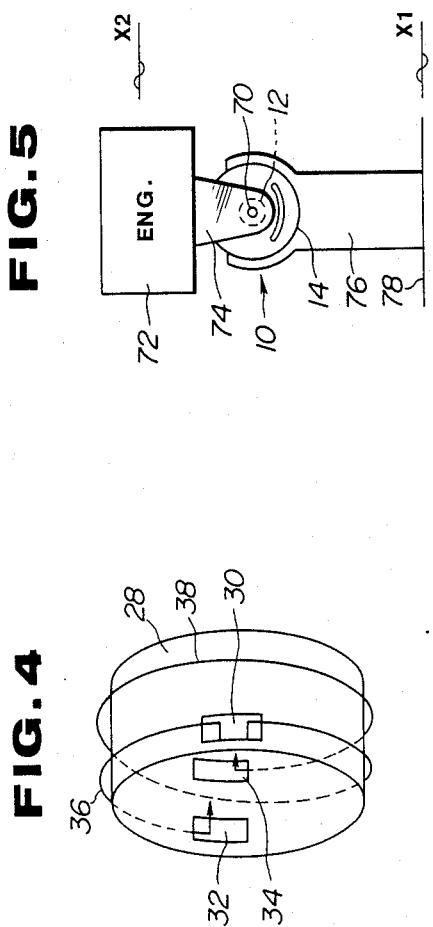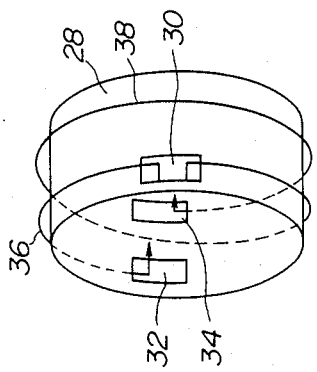

MOUNTING DEVICE SUITABLE FOR SUPPORTING AUTOMOTIVE POWER UNITS

BACKGROUND OF THE INVENTION

1. Field of the Invention

The present invention relates generally to mounting devices of the nature used to support vibrating bodies, and more specifically to vibration damping mounting device which is compact and particularly suited to automotive applications.

2. Description of the Prior Art

JP-A-60-104828 describes an example of damping type unit which takes the form of a hollow elastomeric bush member filled with an electrorheological fluid (or ERF as it will be referred to hereinafter) and which is further provided with an electrically controlled orifice unit which divides the device into a working chamber and an expansion chamber. With this device, when the bush is compressed, fluid is displaced from the working chamber into the auxiliary one (defined between the orifice unit and a relative flexible diaphragm) and vice versa. By applying a high voltage across the electrodes of the orifice, the viscosity of the ERF can be induced to undergo a remarkable increase and the fluid in the orfice passage induced to assume to an almost solid state. Under these conditions the orifice is either effectively blocked or the restrictive properties thereof remarkably increased.

When this type of arrangement is used to support internal combustion engines, for example, it is possible to selectively tune the characteristics of the device in manner which improves the effective vibration damping of the system defined by the engine, mounts and chassis on which the engine is supported. However, in order to effectively damp relatively large amplitude low frequencies (10–30 Hz), such as occur when the engine is idling or undergoes what is referred to as "engine shake", the device becomes excessively bulky and induces design problems.

Experiments conducted by the applicant in connection with this problem, have revealed that if the above type of arrangement is arranged to act as a dynamic damper type arrangement the resonance frequency fo of the mass of the fluid in the orifice passage(s) can be expressed using the following equation:

$$fo = \tfrac{1}{2}\pi \sqrt{\frac{k \times \frac{S1}{S2}^2}{m}} \quad (1)$$

wherein:
S1: is the cross sectional area of the orifice;
S2: is the cross sectional area of the fluid chamber;
m: is the mass of the slug of fluid in the orifice; and
k: is the expansive spring constant of the fluid chamber.

As will be noted from this equation, in order to tune the arrangement so that the resonance frequency occurs in a low frequency range, it is necessary to either necessary to increase the value of m or reduce S1.

It should be noted that m=orifice length×specific gravity of the fluid.

As will be appreciated from the broken lines in FIG. 9, in the event that the orifice cross-sectional area S1 is reduced, the flow resistance of the same increases whereby, in the low frequency region below that at which resonance of the fluid in the orifice occurs, the dynamic spring constant assumes a high value and while the loss factor assumes a low one. This of course is the reverse of the conditions required for appropriate vibration attenuation and thus results in loss of effective vibration damping.

Hence, a solution to the bulkiness of the above mentioned prior art type arrangement has been difficult.

SUMMARY OF THE INVENTION

It is an object of the present invention to provide a mounting arrangement which is both compact and features desirable vibration damping characteristics and which therefore can find ready application in automotive applications and the like, where space is limited.

In brief, the above object is achieved by an arrangement wherein an elastomeric body is formed with first and second recesses which define a working chamber and an expansion chamber. These chambers are filled with an ERF. The recesses are enclosed by an annular member in a manner to define the chambers. First and second helical orifice passages are formed about the periphery of the annular member and fluidly connect the chambers. A cylindrical outer casing which encloses the elastomeric body and annular member is grounded to act as a first electrode. Strips disposed in the orifice passages act as electrodes on which voltages can be selectively and separately impressed.

More specifically, the present invention is deemed to comprise a mounting device for supporting a first body which is subject to vibration, on a second body, and which features: first and second rigid structural members, the second member being hollow, arranged about the first member and electrically grounded; an elastomeric body, the elastomeric body being interposed between the first and second members; an annular member disposed about the periphery of the elastomeric member and arranged to juxtapose the inner periphery of the second member, the annular member being formed with first, second and third apertures and an essentially helical channel in the external periphery thereof, the channel being formed of a first groove which leads from the first aperture to the second aperture, and a second groove which leads from the first aperture to the third aperture, the second groove being longer and narrower than the first groove, the first and second grooves having first and second electrically conductive electrode bodies disposed respectively therein, the first and second grooves being enclosed by the annular member in a manner to define first and second orifice passages; means defining a first recess in the elastomeric body, the first recess being arranged to cooperate with the inner periphery of the annular member in a manner to define a first chamber, the first aperture being arranged to open into the first chamber; means defining a second recess in the elastomeric body, the second recess being arranged to cooperate with the inner periphery of the annular member in a manner to define a second chamber, the second and third apertures being arranged to open into the second chamber, the elastomeric body being further formed with a diaphragm which is exposed to the second chamber; connection means which provides a separate electrical connection between each of the first and second electrode bodies; and an electrorheogical fluid which fills the first and second chambers and the first and second orifice passages.

BRIEF DESCRIPTION OF THE DRAWINGS

FIG. 3 is an exploded view of the embodiment shown in section in FIGS. 1 and 2;

FIG. 4 is a schematic perspective view showing the arrangement of openings and a helical passage which interconnects the same;

FIG. 5 is a model showing the arrangement according to the present invention operatively disposed between and internal combustion engine and a vehicle chassis;

DETAILED DESCRIPTION OF THE PREFERRED EMBODIMENTS

Figure 1:
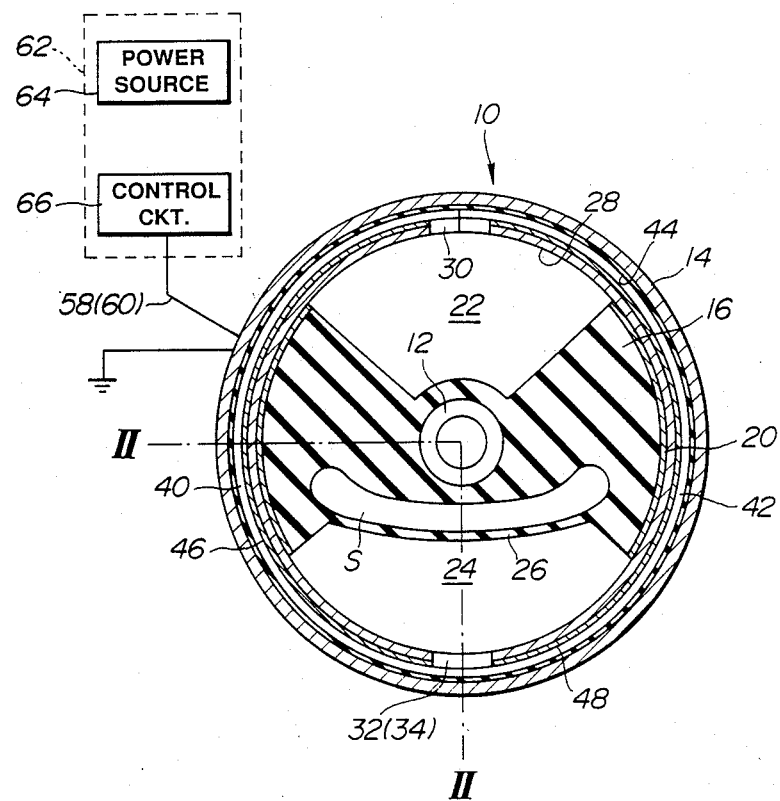
FIG. 1 is a sectional front elevational view showing the constructional arrangement of an embodiment of the present invention.
Figure 2:
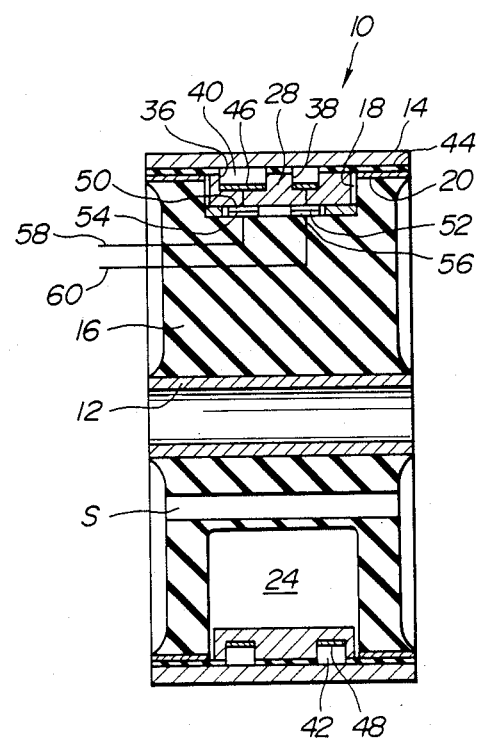
FIG. 2 is a sectional view as taken along section line II—II of FIG. 1.

FIGS. 1 to 3 show constructional details of an embodiment of the present invention. In this case the embodiment takes the form of an engine mount 10 which comprises a tubular inner member 12 and a cylindrical outer casing member 14 which are formed of a metal which exhibits a high rigidity.

A resilient elastomeric insulator body 16 is interposed between the tubular inner member 12 and the cylindrical outer casing 14 and is arranged to support a power unit (viz., an engine, transaxle or the like). The elastomeric body 16 is vulcanized or otherwise permantly connected to the tubular inner member 12 and is shaped in the manner indicated in the exploded view of FIG. 3. As best seen in FIG. 2, the insulator body 16 is formed with an annular groove 18 in which an annular member 28 is received.

Reinforcing members 20 are disposed about the external peripheral portions of the insulator body 16 in the manner best seen in FIG. 3. Further, as shown in FIGS. 1 and 2, the insulator body 16 is formed with cavities or recesses in the central portion thereof. These cavities cooperate with the inner periphery of the annular member 28 in a manner to define main and auxiliary fluid chambers 22, 24.

The insulator body 16 is further formed with cavity S adjacent the auxiliary chamber 24 and arranged to define a diaphragm 26 therebetween. This diaphragm 26 is responsive to volume changes in the auxiliary chamber 24 and arranged to be sufficiently flexible as to permit the attenuation of pressure changes therein. The cavity S is open to the atmosphere as shown in FIG. 2.

The annular member 28 is formed of an electrically non-conductive material such as a robust rigid synthetic resin and is, in this instance, formed in first and second halves which can be placed in position in the annular groove 18 in a manner which facilitates assembly of the unit.

The above mentioned annular member 28 is formed with a first aperture 30 which is arranged to act as a port for the main fluid chamber 22 and with second and third apertures 32 and 34 which are arranged to open into the auxiliary chamber 24 and to act as first and second auxiliary chamber fluid transmission ports, respectively.

A helical channel is defined about the external periphery of the annular member 28. In this embodiment the channel is formed of a first relatively wide groove 36 which extends from the port 30 of the main chamber 22 to the first auxiliary port 32, and a second relatively narrow groove 38 which extends from port 30 to the second auxiliary chamber port 34.

As will be appreciated from FIG. 4, the first groove 36 is shorter than the second 38 and extends about halfway round the perimeter of the annular member 28. On the other hand, the second narrow groove 38 is such as to extend more than once around the external periphery of the annular member in the manner schematically illustrated.

The above described arrangement is disposed within the cylindrical outer casing 14 and insulated therefrom by a thin annular elastomeric layer 44. This layer 44 provides a hermetic seal and encloses grooves 36 and 38 in a manner to define first and second orifice passages 40, 42.

Metallic strips are disposed in the bottom of grooves 36 and 38 in a manner to define first and second electrodes 46, 48.

In this embodiment the cylindrical outer casing 14 is electrically grounded to the vehicle chassis in a manner to act as a negative electrode while the first and second electrodes 46 and 48 are arranged to be connectable the positive terminal of a power source (not shown) via a construction which will be described below.

First and second contacts 50, 52 are formed on the inner periphery of the annular member 28 and electrically connected with the first and second electrodes 46, 48 respectively.

Corresponding third and fourth contacts 54, 56 are disposed on the external periphery of the elastomeric bush 16 and electrically connected with lead lines 58 and 60 embedded in the body. The contacts 50 and 52 are arranged to engage contacts 54 and 56 respectively and thus establish an electrical connection between the lead lines 58, 60 and the electrodes 46 and 48.

The main working fluid chamber 22, the auxiliary chamber 24 and the interconnecting passages are filled with an ERF. When a high voltage is impressed on the electrodes 46 and 48, the ERF in the orifice passages 40, 42 undergoes a marked increase in viscosity and causes what shall be referred to as orifice "stick". Viz., the orifice passages are effectively blocked and the flow of fluid therethrough is highly resisted.

The length and cross-sectional area of the first orifice passage 40 is set so that, when a voltage is not impressed across the electrodes associated therewith and the unit is subject to a vibration (such as the so called secondary vibration which is being produced by a four cylinder engine operating at about 750 RPM) which has a frequency of about 25 Hz, the dynamic spring constant of the mount 10 assumes a minimum value.

On the other hand, the second passage 42 is arranged to have a length and a cross-sectional area which, when a voltage is not impressed across the electrodes associated therewith, is such that the mount exhibits a maximum loss factor with respect to the engine shake resonance frequency of the system defined by mount and power unit supported thereon.

A control circuit 62 (see FIG. 1) includes power supply 64 and the control section 66 which are arranged to produce an ON/OFF type outputs which are determined based on the vehicle speed and the speed at which the relative displacement between the vehicle chassis and the power unit changes, and which are applied independently to the lead lines 58 and 60.

FIG. 5 shows the mount having the above described construction arranged so that a pin 70 connects the tubular inner member 12 with a bracket 74 of a power unit 72 while the cylindrical outer casing 14 is supported by a bracket 76 which forms part of a vehicle chassis 78. When the engine 72 is running, vibration is applied from the engine to chassis 78 via the mount 10.

Under these conditions the elastomeric body 16 resiliently deforms in a manner which tends to absorb the vibration and vary the volume of the main chamber 22. The ERF is displaced between the main and the auxiliary chambers 22, 24 via the orifice passages 40, 42 in a manner which increases the vibration attenuation.

Figure 9:
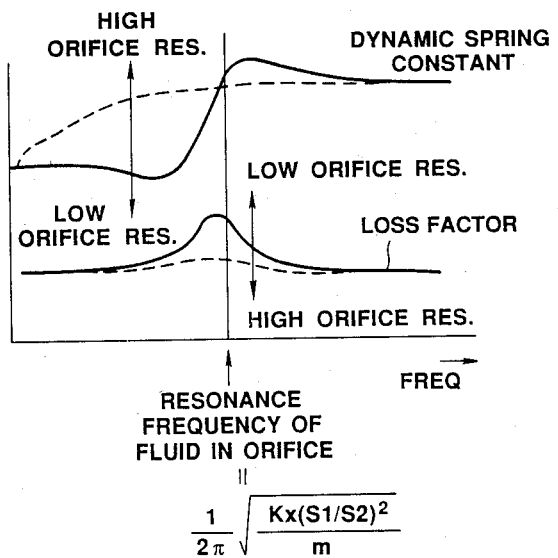
FIG. 9 is a graph which compares the dynamic spring constant and loss factor characteristics produced by the invention and by a prior art arrangement wherein the cross-sectional area of the orifice passage(s) is reduced.

As will be noted from FIG. 4 as the orifice passage 42 winds helically around the perimeter of the annular member 28, the length of this passage can be increased considerably without the need to reduce the cross-sectional area of the same. Therefore, as shown by solid line in FIG. 9, when low frequency vibrations of the nature which occur when the engine is idling or undergoes engine shake, the dynamic spring constant becomes small while the loss factor becomes large. This is particularly so when the vibration occurs in the engine shake region. As will be noted, at this time the loss factor maximizes.

Figure 6:
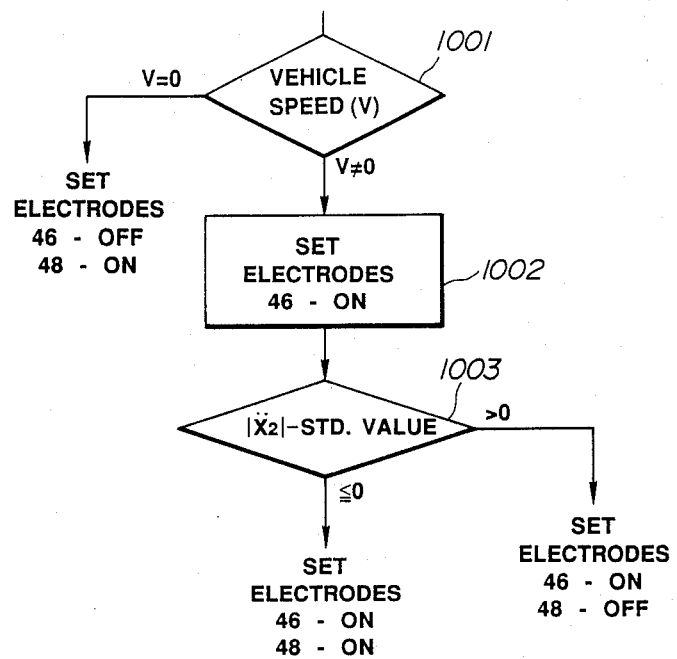
FIG. 6 is a flow chart showing the steps which characterize the control of the orifice arrangement of the embodiment shown in FIGS. 1 to 4.

FIG. 6 shows in flow chart form the steps executed by a control algorithm designed to control low frequency type vibrations.

At step 1001 the vehicle speed V is sampled and compared with a predetermined threshold value (V=0). When the vehicle speed is equal to this value, electrode 48 is impressed with a voltage and the second orifice passage 42 induced to stick.

As the electrode 46 is not energized under these circumstances, the first orifice passage 40 is permitted to transmit ERF freely back and forth between the main and auxiliary chambers 22, 24. This tunes the mount in a manner wherein the dynamic spring constant is minimized and reduces the amount of vibration which tends to be transmitted from the engine to the chassis 78 and passenger comfort notably improved.

When the vehicle speed V is not equal to zero, it is deemed that conditions wherein engine shake is apt to occur, exist, and at step 1002 the first electrode 46 has a voltage impressed thereon and induces the first orifice passage 40 to stick. In addition to this, depending on the speed at which the relative displacement of the engine is occurring, the second orifice is connected in an ON/OFF manner with a source of voltage (in this case positive voltage). Viz., depending on the magnitude of the acceleration of the engine in the vertical direction, the flow resistance of the second orifice passage is selectively increased and decreased.

While the second orifice 42 is open (not induced to stick and induced to exhibit low flow restrictive properties) and the first one (40) induced to exhibit high flow restrictive properties via the impression of a voltage on electrode 46, the loss factor of the unit 10 is maximized and the mass of EFR moving in the orifice passage 42 able to act as a dynamic damper.

Figure 7:
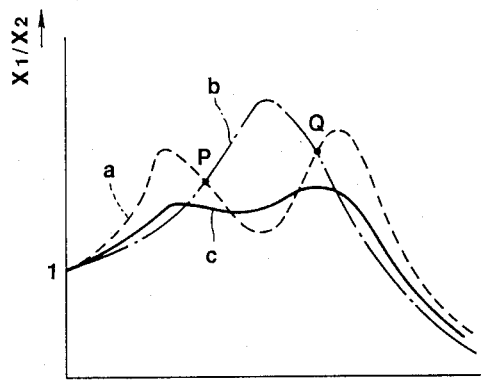
FIG. 7 shows, in terms of vibration transmission ratio and time, a chain line trace a which denotes the vibration transmission characteristics which are produced when a longer narrow one of two passages, is conditioned to exhibit a low flow resistance and a phantom trace b which denotes the vibration transmission characteristics which occur when said passage is conditioned to exhibit a high flow resistance.
Figure 8:
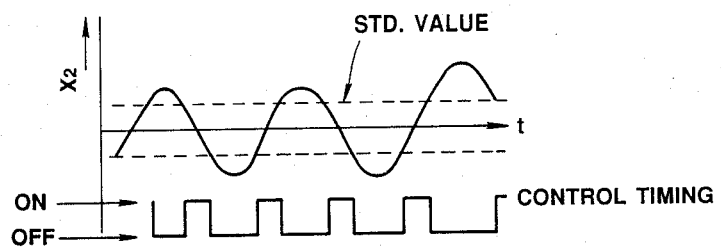
FIG. 8 is a timing chart showing the ON/OFF control utilized to control the second of two orifice passages defined in the embodiment of the present invention and how the ON/OFF control is derived by comparing the vertical acceleration of the engine with upper and lower slice levels.

As shown in FIG. 7, the points P and Q define the intersections which occur between the peaks of traces a and b. In this figure, the chain line trace a denotes the vibration transmission characteristics which are produced when the second electrode 46 is "OFF" while the phantom trace b denotes the vibration transmission characteristics which occur when the second electrode is "ON".

In step 1003 the absolute value of the vertical acceleration of the engine is ranged against a predetermined standard value. When the absolute value is greater than the standard one, electrode 48 is conditioned to assume an "OFF" de-energized state whereby the second orifice passage 42 is induced to exhibit a low flow resistance; while when the absolute valve is equal to or less than the standard value, the second electrode is conditioned to assume an "ON" energized state and the second orifice passage is induced to exhibit a high flow resistance.

In response to this control, the vibration transmission ratio (x2/x1) is reduced and the vibration transmission characteristics denoted by the solid line trace c are produced. Under these conditions engine shake is attenuated.

With the instant embodiment, as the length of the orifice passage 42 is sufficiently great to reduce the dynamic spring constant and maximize the loss factor of the mounting unit 10, and the outer cylindrical member 14 is utilized as the negative electrode for the orifice passages 40, 42, the number of parts which are required to construct the mount is relatively small.

Further, the installation of the metal strips which define the positive electrodes of the device, in the bottom of the helical channels, it is possible to increase the cross-sectional area of the passages easily.

In addition to this, the arrangement of the contacts 50, 52, 54, and 56 and the implantation of the lead lines in the elastomeric body 16 facilitates the assembly of the device during manufacture. The grounding of the negative electrode (viz., cylindrical outer casing 14) further simplifies the wiring and connections with the control circuit.

What is claimed is:

1. A mounting device for supporting a first body which is subject to vibration on a second body, said mounting device comprising;

first and second rigid structural members, said second member being hollow, arranged about said first member and electrically grounded;

an elastomeric body, said elastomeric body being interposed between said first and second members;

an annular member disposed about the periphery of said elastomeric member and arranged to juxtapose the inner periphery of said second member, said annular member being formed with first, second and third apertures and an essentially helical channel in the external periphery thereof, said channel being formed of a first groove which leads from said first aperture to said second aperture, and a second groove which leads from said first aperture to said third aperture, said second groove being longer and narrower than said first groove, said first and second grooves having first and second electrically conductive electrode bodies disposed respectively therein, said first and second grooves being enclosed by said annular member in a manner to define first and second orifice passages;

means defining a first recess in said elastomeric body, said first recess being arranged to cooperate with the inner periphery of said annular member in a manner to define a first chamber, said first aperture being arranged to open into said first chamber;

means defining a second recess in said elastomeric body, said second recess being arranged to cooperate with the inner periphery of said annular member in a manner to define a second chamber, said second and third apertures being arranged to open into said second chamber, said elastomeric body being further formed with a diaphragm which is exposed to said second chamber;

connection means which provides a separate electrical connection between each of said first and second electrode bodies; and an electrorheological fluid which fills said first and second chambers and said first and second orifice passages.

2. A mounting device as claimed in claim 1 further comprising a control circuit for controlling the impression of a voltage on said first and second electrode bodies, said control circuit including means responsive to a first control parameter, in a manner wherein when the magnitude of said control parameter exhibits a first value, a voltage is impressed on said first strip, while when the magnitude of said parameter has a value greater than the first value, the impression of a voltage on said first strip is maintained and a voltage is impressed on said second strip when the absolute value of the acceleration of said first body is below a predetermined value.

3. A mounting device as claimed in claim 2 wherein:
said first body comprises an automotive power unit which includes an internal combustion engine;
said second body includes a vehicle chassis;
said first control parameter is vehicle speed; and
said first value of said first control parameter is zero.

4. A mounting device as claimed in claim 1 wherein said connection means comprises:

first and second lead lines, said first and second lead lines being disposed in said elastomeric body;

first and second contacts, said first and second contacts being disposed on the surface of said elastomeric body and electrically connected with said first and second lead lines respectively;

third and fourth contacts, said third and fourth contacts being disposed in the inner periphery of said annular member, said third and fourth contacts being electrically connected with said first and second electrode bodies and arranged to engage said first and second contacts in manner to establish and electrical connection between said first and second lead lines and said first and second electrode bodies.

5. A mounting device as claimed in claim 4, wherein said first and second electrode bodies comprise first and second elongate thin electrically conductive strips.

6. A mounting device as claimed in claim 1, wherein:
said first chamber is located between said first body and said first structural member; and
said second chamber is located between said second body and said first structural member.

7. A mounting device as claimed in claim 6 wherein said diaphragm is defined in said elastomeric body by a cavity which is located between first structural member and said second chamber.

8. A mounting device as claimed in claim 1 wherein said first and second structural members have cylindrical configurations and are arranged to extend in an essentially horizontal direction.

9. A mounting device as claimed in claim 1 further comprising: a thin elastomeric layer disposed between said annular member and the inner periphery of said second structural member, said layer hermetically sealing the first and second grooves.

10. A mounting device as claimed in claim 1 wherein said elastomeric body is formed with an annular groove about a central portion thereof, and wherein said annular member is formed in first and second halves which can be set into said annular groove in a manner to facilitate assembly of the arrangement prior disposition within said second structural member.

11. A mounting device as claimed in claim 1 wherein said first groove extends about halfway around the annular member and said second groove extends more than once therearound.

* * * * *